(12) United States Patent
Field

(10) Patent No.: US 8,944,721 B2
(45) Date of Patent: Feb. 3, 2015

(54) APPARATUS AND METHOD FOR INSERTION OF GASKETS

(75) Inventor: Keith D. Field, Mount Dora, FL (US)

(73) Assignee: Flange Skillets International, LLC, Kissimmee, FL (US)

(*) Notice: Subject to any disclaimer, the term of this patent is extended or adjusted under 35 U.S.C. 154(b) by 115 days.

(21) Appl. No.: 13/354,911

(22) Filed: Jan. 20, 2012

(65) Prior Publication Data
US 2013/0189037 A1 Jul. 25, 2013

(51) Int. Cl.
*F16L 1/26* (2006.01)
*B25B 27/14* (2006.01)

(52) U.S. Cl.
USPC .......................... 405/184.1; 29/270

(58) Field of Classification Search
USPC ............. 405/170, 184.1; 29/283, 428, 270; 269/131; 277/609
See application file for complete search history.

(56) References Cited

U.S. PATENT DOCUMENTS

| | | | |
|---|---|---|---|
| 811,000 A | 1/1906 | Tompkins | |
| 1,896,795 A | 2/1933 | Kendall | |
| 3,292,922 A * | 12/1966 | Nastev | 269/131 |
| 3,480,301 A | 11/1969 | Kroening | |
| 3,620,554 A | 11/1971 | Ward et. al | |
| 3,909,011 A | 9/1975 | Sheesley | |
| 4,002,344 A | 1/1977 | Smith | |
| 4,495,689 A | 1/1985 | McNeal et al. | |
| 4,495,690 A | 1/1985 | McNeal | |
| 4,522,536 A | 6/1985 | Vidrine | |
| 4,695,677 A | 9/1987 | Ruth et al. | |
| 5,004,017 A | 4/1991 | White | |
| 5,401,062 A | 3/1995 | Vowles | |
| 5,461,904 A | 10/1995 | Baker | |
| 6,260,854 B1 | 7/2001 | Lemon | |
| 8,025,080 B2 | 9/2011 | Orleskie et al. | |
| 2011/0167607 A1 | 7/2011 | Vidrine et al. | |

FOREIGN PATENT DOCUMENTS

| EP | 0767336 A2 | 4/1997 |
|---|---|---|
| GB | 685670 A | 1/1953 |
| WO | WO2007/083203 A2 | 7/2007 |

* cited by examiner

*Primary Examiner* — Tara M. Pinnock
(74) *Attorney, Agent, or Firm* — Jason P. Mueller; Adams and Reese LLP

(57) ABSTRACT

A gasket insertion apparatus and method for inserting a gasket between the adjoining faces of a flange assembly are provided. The gasket insertion apparatus includes a frame, a member and a wire. The frame has a first end, a second end and an inner gripping surface. The first and second ends have guides. The member has a first end portion attached to the frame and a second portion extending away from the frame. The wire is anchored to at least one of the frame and the member such that it movably adjusts within the guides and secures the gasket within the inner gripping surface.

23 Claims, 4 Drawing Sheets

APPARATUS AND METHOD FOR INSERTION OF GASKETS

FIELD

The invention relates generally to an apparatus and method for insertion of gaskets and, more particularly, to an apparatus for and a method of inserting fluid sealing gaskets between flange connectors of adjacent pipe sections of underwater pipe line sections.

BACKGROUND

In laying underwater pipelines, divers or remotely operated vehicles ("ROV"s) are often utilized to bolt together opposing connector flanges of adjacent pipe sections. A fluid sealing gasket is typically installed between the flanges. Some flange assemblies, such as American National Standards Institute (ANSI) specified ring-type joint (RTJ) flange assemblies, are designed such that there is a space or gap between the flange faces to allow all or a portion of a gasket insertion device to remain in the completed assembly once the gasket is in place. However, other types of RTJ flange assemblies do not have a space or gap between the flange faces. In such situations, gasket insertion devices that are designed to leave a portion of the device inside of the flange assembly after placement of the gasket cannot be used because there is no gap to accommodate the remaining portion of the device.

Certain currently available gasket placement devices, such as the apparatus described in U.S. Patent Pub. No. 2011/0167607, are designed such that the lower portion of the frame within which the gasket is contained during placement is configured to break away from the remainder of the apparatus such that this lower portion remains in the flange with the gasket. Such devices are unusable in situations where little or no space is present between the flange faces to accommodate the breakaway portion of the apparatus.

It is desirable to have a gasket placement tool that provides for easy gasket insertion and eliminates the breakaway portion of the aforementioned device. Further it is desirable to have a gasket placement tool that is configured to adequately restrain a gasket within its frame during transportation and placement. Additionally it is desirable for such a device to be configured such that the tool may be removed from the flange assembly after the gasket is in place.

SUMMARY

According to an exemplary embodiment of the present invention, an improved apparatus and method are provided for the insertion of fluid sealing gaskets between opposing faces of flange connectors fixed to the ends of pipe sections. The improved apparatus may include a handle suitable for use with both deep water diving suits and remotely operated vehicles. The handle may be attached to an open curved member within which a gasket is retained during placement. The apparatus may further include a retention wire configured to restrain the gasket in place within the curved member during placement. After gasket insertion and placement, the retention wire may be cut, and the wire and apparatus removed from the flange assembly. The apparatus may be provided with one or more holes in the handle to allow for the insertion of a threaded stud which will serve as a depth or alignment gauge to aid the diver in properly aligning the gasket between the bolt holes of adjoining flanges. The handle may have a slit at the top center of the curved member to allow for enough flex to make the removal of the apparatus from the gasket (upon insertion and placement) more reliable.

DETAILED DESCRIPTION

Figure 1:
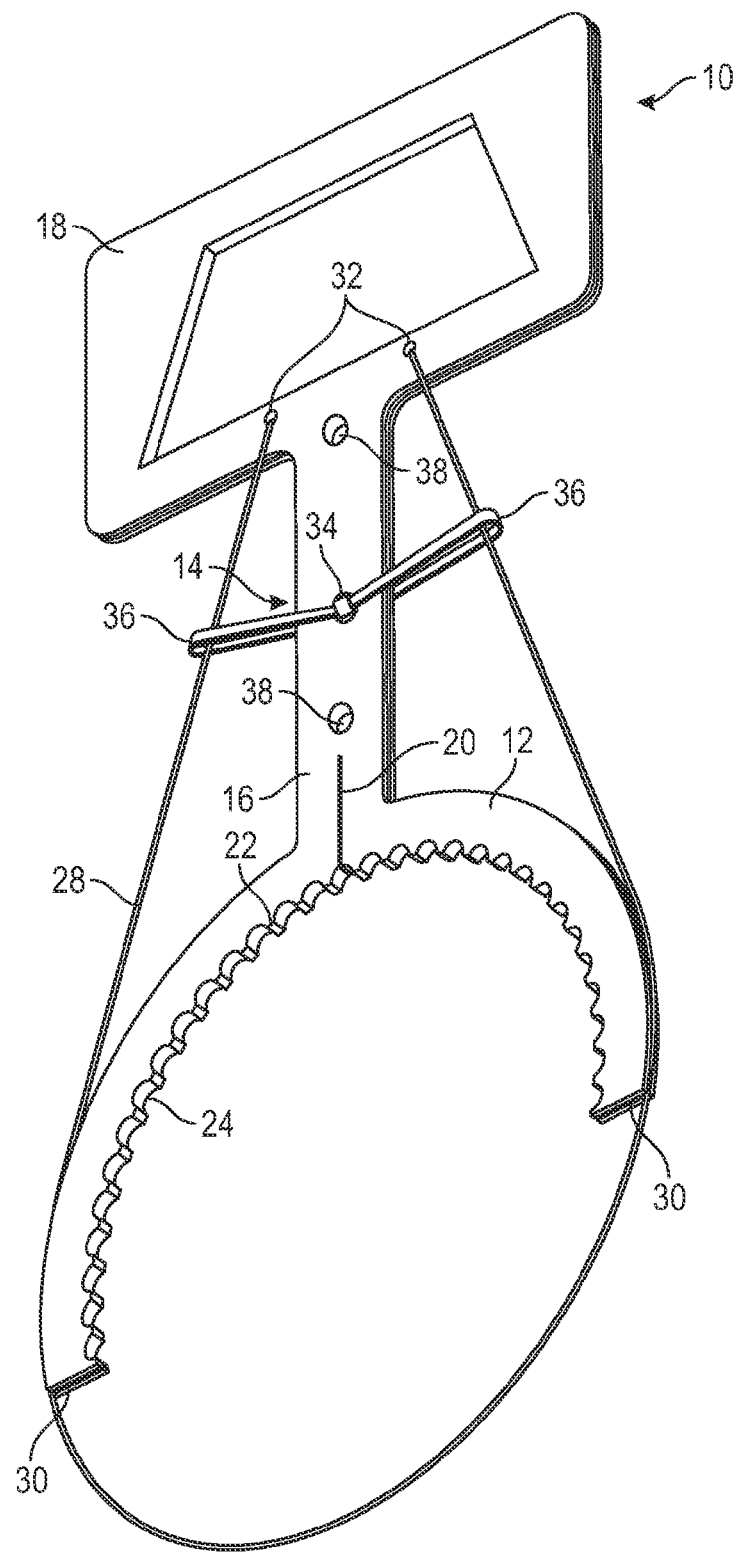
FIG. 1 is an isometric view of a gasket insertion apparatus, according to an exemplary embodiment of the present invention.

Referring now to the drawings, and in particular to FIG. 1, there is shown a gasket insertion apparatus 10 for inserting a fluid sealing gasket between flange connectors of adjacent pipe sections. The apparatus 10 includes a flat, curved gasket-holder frame 12 having a handle 14. The handle 14 includes a shaft 16, the proximal end of which is attached to the frame 12 so that the handle shaft extends radially outward from the outer edge of the gasket-holder frame 12. The apparatus 10 may be made of any structurally suitable material, for example, aluminum or aluminum alloys, steel, stainless steel, mild steel, polymeric composites, sheet metal, and industrial laminates. In some embodiments, the shape of frame 12 may be any of a curve, an arc, a semicircle, or any other shape appropriate to match the contour of a gasket 26 contained therein.

In order to facilitate the removal of the entirety of apparatus 10 from within a flange assembly once a gasket has been positioned therein, frame 12 may have an open-ended shape, such as a "U" or semicircle, for example. The size of such an opening in frame 12 may be configured such that, once a gasket 26 has been positioned within a flange assembly, apparatus 10 is removed from the assembly, but gasket 26 remains in place by exiting apparatus 10 through the open end of frame 12 as apparatus 10 is pulled away. In an embodiment, the circumference of curved frame 12 is approximately 55% of the circumference of a completely circular frame of the same radius. This embodiment provide a large enough opening and surface area for a gasket 26 to exit upon positioning within a flange assembly while still stabilizing gasket 26 within frame 12 during transportation and placement.

A handle grip 18 may be attached to the end of shaft 16 that is distal from the frame 12 and may be configured as an open trapezoidal shaped ring, or any other shape suitable for gripping. Thus, handle grip may be configured to be gripped by a hand (with or without a glove), a diving suit manipulator, and/or the manipulator of a ROV, for example. The handle shaft 16 may have a split or a slit 20 that extends along the length of the handle shaft 16. Slit 20, which begins on the inside edge of frame 12 and extends radially along handle shaft 16 allows apparatus 10 to flex, bend, or otherwise temporarily or permanently distort such that all of apparatus 10 may be removed from a flange assembly while leaving gasket 26 in place. In certain embodiments, slit 20 begins on the inside edge of frame 12 and extends radially along handle shaft 16 for a distance of ½ the total circular width of frame 12.

Handle grip 18 may be dimensioned to accommodate a human hand, a glove, a manipulator of a diving suit, and/or the robotic manipulators of a ROV. In some embodiments handle grip 18 may include various open geometric configurations such as a trapezoidal, triangular, circular, or rectangular ring-shaped configuration. In certain embodiments, handle grip 18 may have no opening and instead configured such that, for example, a user (or ROV manipulator) grips handle grip 18 by its outer edges.

The interior periphery 24 of the curved frame 12 may be provided with a plurality of serrations or angularly cut teeth 22. These teeth 22 serve to grab and hold in place a resilient gasket 26 positioned within the interior periphery 24 of the frame 12. The gasket 26 is positioned on the frame so that the outer diameter of the gasket 26 will fit against the interior periphery 24 of the curved frame 12. While teeth 22 are shown in FIG. 1, other arrangements may be used so long as they grip or secure gasket 26 to apparatus 10. For example, serrations, threads, prongs, bumps, or any other appropriate shape may also be used.

Retention wire 28 is anchored to handle grip 18 via holes 32. Wire 28 may be solid, braided (as in a rope or a string), or any other suitable construct. Wire 28 may be comprised of nylon, copper, steel, aluminum, rubber, or any other suitable material, including various composite materials. In one embodiment of the present invention, retention wire 28 is a 1/32" 3×7 stainless steel (US military spec grade) wire rope. In certain embodiments, holes 32 are 1/8" holes.

Retention wire 28 wraps around the outer circumference of frame 12 and makes contact with gasket 26 such that gasket 26 is restrained within the interior periphery 24 of frame 12. Grooves 30 are in the outer circumferential edge of frame 12 and hold retention wire 28 in place such that wire 28 is prevented from slipping off of the surface frame 12. Grooves 30 may be formed by etching, sawing, milling, or any other appropriate cutting technique. The width of grooves 30 is such that retention wire 28 remains engaged within the groove, but loose enough such that wire 28 can be pulled out of the groove once wire 28 has been cut. One or more tensioners 36 may be anchored to handle 16 vial hole 34. Tensioners 36 may be adjustable and may be configured to pull retention wire 28 towards handle 16 such that retention wire 28 is tightened about gasket 26 once it is in place within interior periphery 24. In certain embodiments, tensioners 36 may be cable-ties (for example, tie-wraps), rubber bands, turn buckles, or any appropriate tensioning device. For example, FIG. 1 shows tensioners 36 as cable-ties. In such embodiments, One or more cable-ties 36 are looped around wire 28 and through hole 34. Once gasket 26 is in place, the one or more cable-ties 36 may be tightened by adjusting a locking or securing mechanism such that wire 28 is pulled and secured inward towards handle 16, thereby increasing the tension of wire 28 about gasket 26.

Handle 16 may further include one or more holes 38. In certain embodiments, one or more of holes 38 may be configured to accept and firmly hold a threaded stud, dowel, pin, or other such cylindrical member which will then serve as a depth or alignment gauge to aid in centering gasket 26 as the apparatus 10 and the gasket 26 are inserted between adjoining pipe flanges 40. In such embodiments, one or more of holes 38 may be precisely located to correspond with the outside diameter of a specified flange assembly. Thus, as apparatus 10 is inserted between adjoining pipe flanges 40, the presence of a threaded stud, dowel, pin, or other such member within hole 38 may halt the progress of apparatus 10 into the flange assembly when gasket 26 is centered therein. In one such embodiment one hole 38 is ¼" and configured to allow for the insertion of a ¼" threaded stud. In further embodiments, one or more of holes 38 may be used to attach a hook, tether, or line to apparatus 10 for use in lowering or raising the device.

Figure 2:
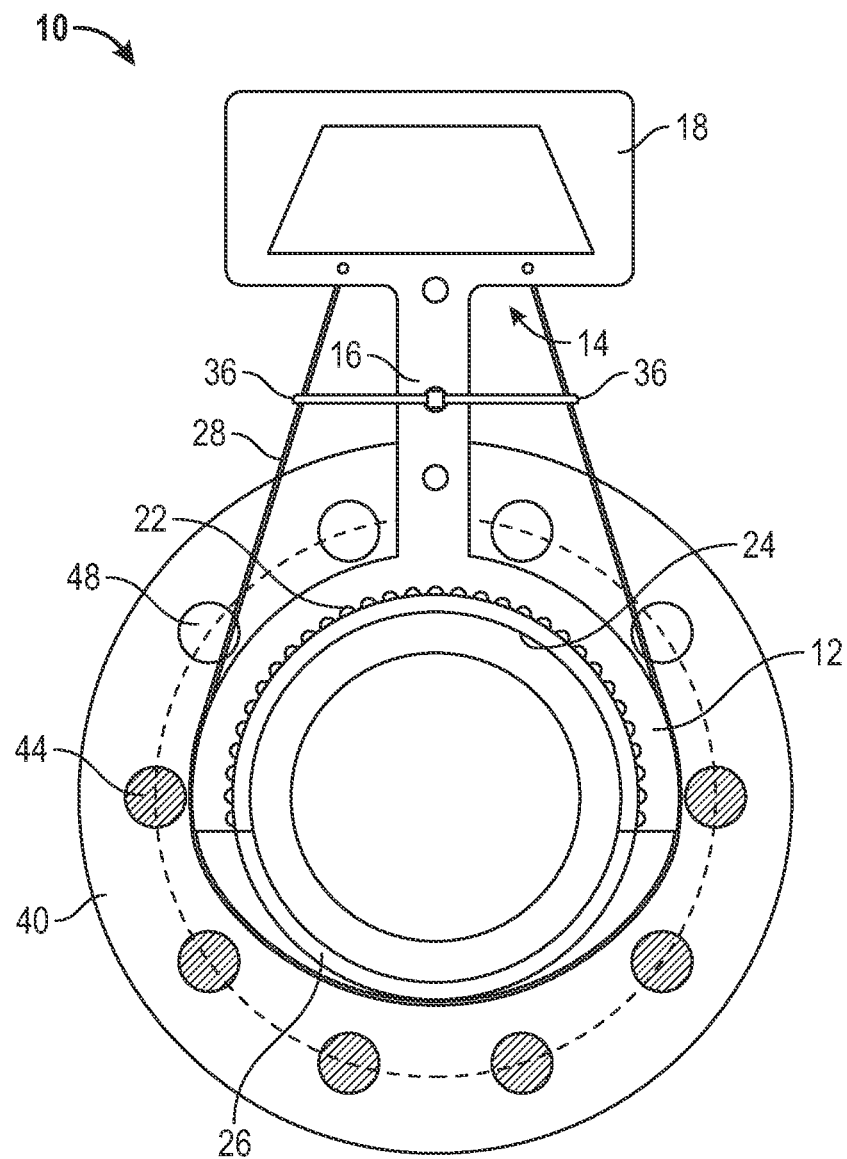
FIG. 2 is a front view of the gasket insertion apparatus of FIG. 1 holding a gasket in place between the flange connectors of a pipeline, according to an exemplary embodiment of the present invention.
Figure 3:
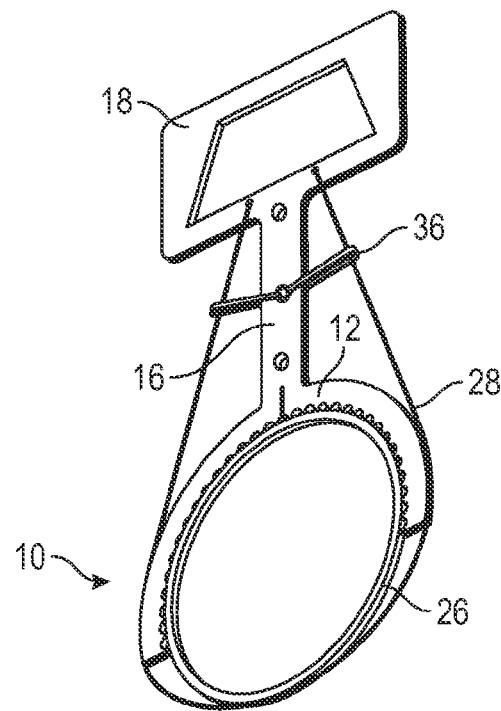
FIG. 3 is an isometric view of the gasket insertion apparatus of FIG. 1 containing a gasket and positioned above the flanges of a pipeline prior to gasket insertion, according to an exemplary embodiment of the present invention.
Figure 3:
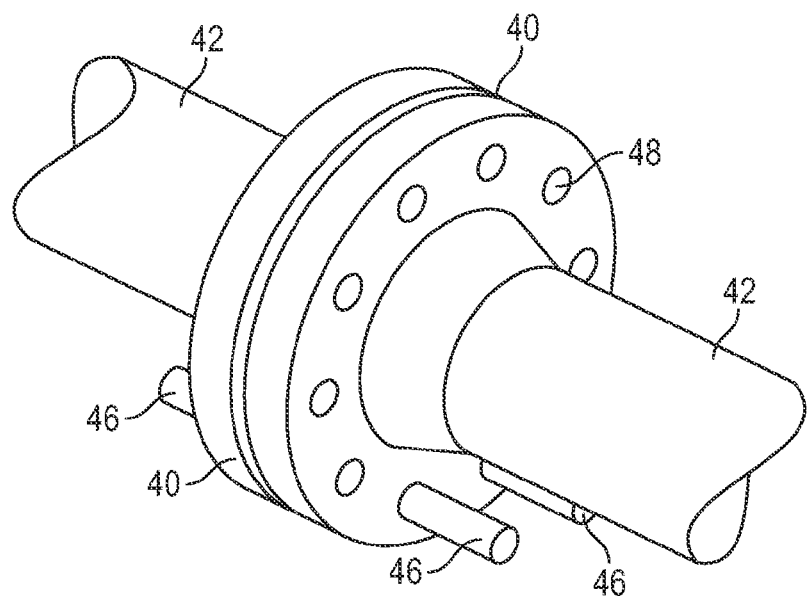

The gasket insertion apparatus 10 and gasket 26 may be configured for use, as shown in FIGS. 2 and 3, by positioning the ring-shaped gasket 26 within the interior periphery 24 of the frame 12 so that the outer diameter of the gasket 26 is fitted against the interior periphery 24 of the curved frame 12. Retention wire 28 contacts gasket 26 at the open end of frame 12 such that, when retention wire 28 is tightened by tensioners 36, gasket 26 is restrained within the interior periphery 24 of the frame 12. Fitting the resilient gasket 26 within the frame 12 in that manner will allow the teeth 22 and retention wire 28 to hold the gasket 26 in place within the interior periphery 24 of the frame 12.

Figure 4:
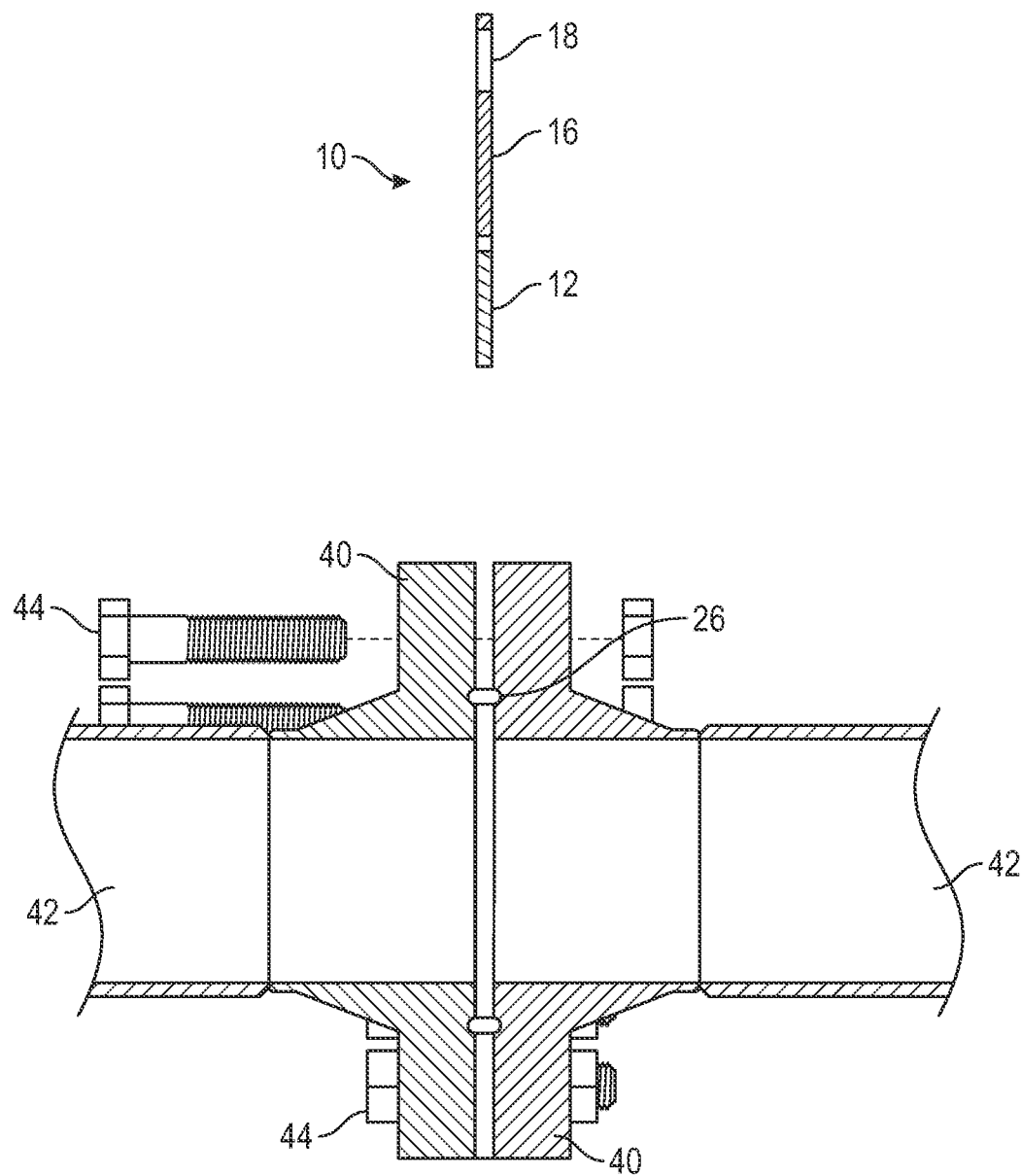
FIG. 4 is a cross-section view of the gasket insertion gasket insertion apparatus of FIG. 1 withdrawn from between the connecting flanges of a pipeline segment after a gasket has been inserted, according to an exemplary embodiment of the present invention.

As shown in FIGS. 3 and 4, the use of the combination of the insertion apparatus 10 and a gasket 26 fitted within the frame 12 as described herein will allow a diver to effectuate the placement of the gasket 26 between the connection flanges 40 of pipeline segments 42 using only two alignment pins 46 and without having to place his hands or fingers between the flanges 40. Thus, a diver (or ROV) will be able to place and position the gasket 26 in the desired location without having to connect most of the bolts associated with the connection flanges.

The apparatus 10 is used by placing a gasket 26 onto the interior periphery 24 defined by the frame 12 so that the gasket 26 is retained within the periphery 24 of the frame 12. The teeth 22 around the interior periphery 24 of the frame 12 serve to increase this frictional fit and hold the gasket 26 in place. Retention wire 28 prevents gasket 26 from falling out of the open end of frame 12. A number of apparatus 10 and gasket 26 combinations may be made up, as described, prior to a dive and kept available for use.

When a flange to flange connection is to be made during a dive, a diver may bring the connection flanges 40 of adjacent pipe segments 42 together in a desired proximity and places bolts 44 or alignment pins 46 in selected flange bolt holes 48 on the connection flanges 30. Preferably at least two alignment pins 46 are utilized and these alignment pins 46 are placed at approximately adjacent bolt holes 48 on the flanges 40.

The apparatus 10, with the inserted gasket 26 in place, is then grasped by the handle grip 18 by a diver or by the gripping arms of an ROV. The apparatus 10 with the inserted gasket 26 is then placed between the adjacent connection flanges 40 at the ends of adjacent pipe sections 42. The alignment pins 46 may serve as a stop for the frame 12 to facilitate vertical and horizontal centering of the frame 12 of the apparatus 10 and thus the gasket 26 between the connection flanges 40.

Once gasket 26 is satisfactorily in place, retention wire 28 may be cut or released such that apparatus 10 may be removed from the flange assembly, leaving gasket 26 in place.

Use of the insertion apparatus 10 in combination with a gasket 26 may allow a diver or ROV more flexibility with fixing the distance needed between the faces of the pipe flanges that are to be connected before the gasket 26 is installed, especially when alignment pins 46 are used to position the opposing flanges adjacent to each other. The use of insertion apparatus 10 in combination with a gasket 26 and alignment pins 46 may also increase the safety of the diver as well as reduce the gasket installation time.

According to an exemplary embodiment of the present invention a method is provided to use the apparatus 10 to insert a gasket into a closed faced connection flange or similar flange assembly having little or no space for any part of the apparatus to remain in the completed assembly. A gasket 26 is frictionally mounted in place on its radial periphery by teeth 22 or another contact surface that is provided around the interior periphery 24 of the frame 12. Retention wire 28 may be wrapped around the outer circumferential surface of frame 12 through grooves 30 and tightened with tensioners 36 such that gasket 26 is restrained within the interior periphery 24 of frame 12 and prevented from falling out of the open end during transportation and insertion of gasket 26. The apparatus 10 and mounted gasket 26 may then be brought to the location where the flanged connection is to be made. The closed face flanges 40 of adjacent pipe segments 42 may be brought together and held in place by at least two bolts 44 or two alignment pins 46. The gasket 26 may then be installed by placing the insertion apparatus 10, with the gasket 26 in place, between the flanges 40 in a manner sufficient to engage the gasket 26 and place it in a desired position between the two adjoining connection flanges. Additional connection bolts 44 may then be installed to stabilize the flange and gasket configuration. Retention wire 28 may then be cut to allow the removal of apparatus 10 to allow the gasket 26 to remain in place between the flanges 40. The apparatus 10 may then be removed by pulling the apparatus 10 away from the flanges 40 leaving the gasket 26 in place, and the remainder of the connection bolts 44 may then be inserted and tightened to complete the connection of the pipe segments 32.

The apparatus for and method of inserting fluid sealing gaskets between the flange connectors of adjacent pipe sections of underwater pipe lines presented herein as well as its attendant advantages will be understood from the foregoing description. It will be apparent that various changes may be made in the form, construction and arrangement of the parts thereof without departing from the spirit and scope of the invention or sacrificing all of its material advantages, the forms described herein being merely an example embodiments of the invention.

What is claimed is:

1. A system, comprising: a gasket; a flange assembly having two flanges, the two flanges having a plurality of bolt holes; and a gasket insertion apparatus, the gasket insertion apparatus having a curved frame including a first end, a second end, an inner peripheral curved surface and an outer surface, the inner surface having gripping members, the outer surface having a first groove formed in the first end of the curved frame and a second groove formed in the second end of the curved frame; a handle shaft attached to the frame, the handle shaft having a proximal end attached to the frame and a distal end extending away from the frame; a handle grip attached to the distal end of the shaft, the handle grip configured to be gripped by at least one of a human hand and a manipulation arm of an underwater remotely operated vehicle; a wire having a first end and a second end, wherein the first and the second ends of the wire are anchored to at least one of the handle grip and the handle shaft such that the wire is secured to the arced frame and the gasket is secured within the inner surface of the frame; and at least one tensioning member anchored to at least one of the handle shaft and the handle grip, the tensioning member adjustable such that at least one of a first and second portion of the tensioning member tightens against at least one of: (a) a first portion of the wire extending between the at least one of the handle shaft and the handle grip and the first groove and (b) a second portion of the wire extending between the at least one of the handle shaft and the handle grip and the second groove such that the wire and secures the gasket within the inner surface of the frame, wherein the wire adjustably moves within the first groove and the second groove when tightened and the first and second grooves guide the wire, wherein the handle shaft includes a slit, the slit providing flexion in the gasket insertion apparatus, wherein a portion of the handle spans between edges of adjacent bolt holes on the adjoining flanges when joined.

2. The system of claim 1, wherein the gasket insertion apparatus is at least one of aluminum, sheet metal and steel.

3. The system of claim 1, wherein the gripping members are angularly cut teeth.

4. The system of claim 1, wherein the at least one tensioning member is at least one of a cable-tie, a rubber band, and a turn buckle.

5. The system of claim 1, wherein the circumference of the arced frame is greater than approximately 50% of a circumference of a completely circular frame of a same consistent radius.

6. A gasket insertion apparatus, comprising: a frame having a first end, a second end and an inner surface, the first and second ends having guides; a member having a first end portion attached to the frame and a second portion extending away from the frame; and a wire anchored to the apparatus such that it movably adjusts within the guides and secures a gasket within the inner surface; and a tensioning member secured to the member, wherein at least one of a first and second portion of the tensioning member tightens against at least one of: (a) a first portion of the wire extending between the member and the first end and (b) a second portion of the wire extending between the member and the second end.

7. The gasket insertion apparatus of claim 6, wherein the member includes a handle grip shaped such that is grippable by one of a human hand and a manipulation arm of an underwater remotely operated vehicle.

8. The gasket insertion apparatus of claim 6, wherein the wire adjustably moves within the guides when tightened.

9. The gasket insertion apparatus of claim 6, wherein the tensioning member is adjustable such that it tightens and locks the wire into place thereby securing the gasket within the inner surface.

10. The apparatus of claim 9, wherein the at least one tensioning member is one of a cable-tie, a rubber band, and a turn buckle.

11. The gasket insertion apparatus of claim 6, wherein an elongated slit is included within the frame and the member such that the apparatus flexes and is removable from a flange assembly.

12. The gasket insertion apparatus of claim 6, wherein the member includes a width portion so dimensioned as to be insertable between edges of bolt holes of a flange.

13. The gasket insertion apparatus of claim 6, wherein the member includes a trapezoidal shaped ring.

14. The gasket insertion apparatus of claim 6, wherein the apparatus is one of aluminum, sheet metal, and steel.

15. The apparatus of claim 6, wherein the inner surface includes a gripping surfaces having angularly cut teeth members.

16. The apparatus of claim 6, wherein the wire is at least one of a wire rope, a string and a deformable elongated member.

17. The apparatus of claim 6, wherein the member includes an aperture configured to receive a second member and securely hold the second member such that the second member facilitates insertion of the apparatus into a flange assembly when a gasket contained within the apparatus is centered within the flange assembly.

18. The apparatus of claim 17, wherein the second member is one of a threaded stud, a dowel, and a pin.

19. The apparatus of claim 6, wherein the circumference of the curved frame is greater than approximately 50% of a circumference of a completely circular frame of a same consistent radius.

20. A method of inserting a fluid sealing gasket between the bolted connection flanges of adjacent underwater pipe line segments comprising the steps of:
 (a) mounting a fluid sealing gasket in a gasket insertion apparatus including an arced frame having a first end, a second end and an inner surface, the first and second ends having guides; a member having a first end portion attached to the arced frame and second portion extending away from the arced frame; a wire anchored to the apparatus; and a tensioning member secured to the member, wherein at least one of a first and second portion of the tensioning member tightens against at least one of: (a) a first portion of the wire extending between the member and the first end and (b) a second portion of the wire extending between the member and the second end;
 (b) adjusting the wire such that it secures the gasket within the inner surface;
 (c) bringing the gasket insertion apparatus with the mounted gasket to an underwater location having a bolted flange connection;
 (d) aligning the adjoining flanges by inserting at least two alignment pins through selected bolt holes of each of the adjoining flanges;
 (e) grasping the member of the gasket insertion apparatus with at least one of a human hand and a manipulator arm of an underwater remotely operated vehicle;
 (f) inserting the gasket insertion apparatus with the mounted gasket between the adjoining flanges;
 (g) bolting the adjoining flanges together with the bolts;
 (h) at least one of cutting and releasing the wire; and
 (i) removing the apparatus from between the adjoining flanges such that the gasket remains in place between the adjoining flanges.

21. The method of claim 20, further comprising the step of tightening the at least one tensioning member such that the wire tightens around the gasket and is secured into place such that the gasket is securely held within the apparatus.

22. The method of claim 20, wherein the at least one tensioning member is at least one of a cable-tie and a turn buckle.

23. The method of claim 20, wherein the circumference of the curved frame is greater than approximately 50% of a circumference of a completely circular frame of a same consistent radius.

* * * * *